US012466022B2

(12) United States Patent
Ricketts et al.

(10) Patent No.: US 12,466,022 B2
(45) Date of Patent: Nov. 11, 2025

(54) MANDREL FOR USE IN THE MACHINING OF OPHTHALMIC LENSES

(71) Applicant: CooperVision International Limited, Fareham (GB)

(72) Inventors: David Ricketts, Southampton (GB); Edward James Harley Evans, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/840,919

(22) PCT Filed: Oct. 26, 2023

(86) PCT No.: PCT/GB2023/052806
§ 371 (c)(1),
(2) Date: Aug. 23, 2024

(87) PCT Pub. No.: WO2024/089433
PCT Pub. Date: May 2, 2024

(65) Prior Publication Data

US 2025/0108470 A1 Apr. 3, 2025

Related U.S. Application Data

(60) Provisional application No. 63/420,733, filed on Oct. 31, 2022, provisional application No. 63/420,256, filed on Oct. 28, 2022.

(51) Int. Cl.
*B24B 13/005* (2006.01)
*G02C 7/04* (2006.01)

(52) U.S. Cl.
CPC .............. *B24B 13/005* (2013.01); *G02C 7/04* (2013.01)

(58) Field of Classification Search
CPC .............. B24B 13/005; B24B 13/0052; B24B 13/0057; B24B 13/0025; B24B 13/012; B24B 9/142
(Continued)

(56) References Cited

U.S. PATENT DOCUMENTS 2,736,993 A * 3/1956 Tripp .................... B24B 13/023 451/289
3,512,310 A 5/1970 Rudd et al.
(Continued)

FOREIGN PATENT DOCUMENTS

CN 106794567 A 5/2017
CN 107107499 A 8/2017
(Continued)

OTHER PUBLICATIONS

International Search Report and Written Opinion issued in corresponding International Patent Application No. PCT/GB2023/052806 mailed Jan. 4, 2024 (18 pages).
(Continued)

*Primary Examiner* — Makena S Markman
(74) *Attorney, Agent, or Firm* — Kilyk & Bowersox, P.L.L.C.

(57) ABSTRACT

A mandrel 1 for holding an ophthalmic lens member blank 52 during machining is disclosed. The mandrel 1 comprises a front surface 6 for receiving an ophthalmic lens member blank 52 to be machined; a rear surface 8 opposite the front surface 6; and one or more through-holes 10 extending between the front and rear surfaces 6,8. In use, wax applied to the rear surface 8 contacts an ophthalmic lens member blank 52 received on the front surface 6 via said one or more through-holes 10. Methods of producing an ophthalmic lens using such a mandrel and lenses produced using such a mandrel are also disclosed.

18 Claims, 9 Drawing Sheets

(58) Field of Classification Search
USPC .................................... 451/42, 384, 277, 240
See application file for complete search history.

(56) References Cited

U.S. PATENT DOCUMENTS

| | | | | |
|---|---|---|---|---|
| 3,996,701 | A * | 12/1976 | Ramirez | B24B 13/0057 451/390 |
| 4,619,082 | A * | 10/1986 | Dent | B24B 13/005 451/390 |
| 5,177,907 | A * | 1/1993 | Rothe | B24B 13/005 451/390 |
| 5,205,076 | A | 4/1993 | Vernon et al. | |
| 5,474,489 | A * | 12/1995 | Vernon | B24B 13/005 451/390 |
| 5,494,474 | A | 2/1996 | Vernon | |
| 5,577,950 | A * | 11/1996 | Smith | B24B 13/02 451/384 |
| 5,919,563 | A | 7/1999 | Parish, Jr. et al. | |
| 6,012,965 | A * | 1/2000 | Savoie | B29D 11/00961 451/384 |
| 6,045,438 | A * | 4/2000 | Shay | B24B 13/005 451/384 |
| 6,110,016 | A * | 8/2000 | Coleman | B24B 13/005 451/390 |
| 6,126,528 | A * | 10/2000 | Sedlock | B24B 13/0057 451/384 |
| 6,224,467 | B1 | 5/2001 | Tanaka et al. | |
| 2001/0008314 | A1* | 7/2001 | Tanaka | B29D 11/00432 425/808 |
| 2001/0051490 | A1* | 12/2001 | Siders | B24B 27/0076 451/41 |
| 2002/0135893 | A1* | 9/2002 | Hirose | G11B 7/0933 |
| 2009/0231688 | A1* | 9/2009 | Shyu | G02B 7/025 359/830 |
| 2016/0101579 | A1 | 4/2016 | Benz et al. | |
| 2017/0304984 | A1 | 10/2017 | Savoie et al. | |
| 2017/0361415 | A1 | 12/2017 | McClimans et al. | |
| 2021/0178555 | A1* | 6/2021 | Benz | B25B 11/00 |

FOREIGN PATENT DOCUMENTS

| | | | |
|---|---|---|---|
| CN | 107107500 | A | 8/2017 |
| JP | 2004314288 | A | 11/2004 |
| WO | 9409946 | A1 | 5/1994 |
| WO | 9710924 | A1 | 3/1997 |
| WO | 2016097736 | A1 | 6/2016 |
| WO | 2021119455 | A1 | 6/2021 |
| WO | 2024089434 | A1 | 5/2024 |

OTHER PUBLICATIONS

PCT Demand filed May 30, 2024 in corresponding International Patent Application No. PCT/GB2023/052806 (19 pages).

International Preliminary Report on Patentability issued in corresponding International Patent Application No. PCT/GB2023/052806 mailed Jul. 5, 2024 (17 pages).

Office Action issued in corresponding Chinese Patent Application 202380029350.8 dated Jan. 25, 2025 (17 Pages).

Office Action issued in corresponding Japanese Patent Application 2024-553339 issued May 15, 2025 (8 Pages).

* cited by examiner

MANDREL FOR USE IN THE MACHINING OF OPHTHALMIC LENSES

This application is a National Stage Application of PCT/GB2023/052806, filed Oct. 26, 2023, which claims priority to U.S. Patent Application Nos. 63/420,256, filed Oct. 28, 2022 and 63/420,733, filed Oct. 31, 2022.

The present disclosure concerns a mandrel for use in the machining of ophthalmic lenses, more particularly, but not exclusively, contact lenses. The disclosure concerns a mandrel for holding an ophthalmic lens member blank during machining, a kit of parts comprising such a mandrel, a method of mounting an ophthalmic lens member blank on a mandrel, a method of machining an ophthalmic lens member blank and an ophthalmic lens machined using such a mandrel and/or method.

BACKGROUND

Ophthalmic lenses are often produced by machining an ophthalmic lens blank, for example to provide a desired shape or surface finish. A high degree of accuracy in such operations is necessary in order to ensure the finished lens has the required properties. A mandrel is used to hold the ophthalmic lens blank during machining, for example to mount the lens blank on a lathe for cutting, or to hold the lens blank during polishing or grinding.

Typically, a block of wax is provided on a front surface of the mandrel, and the lens blank is pushed into the wax which then sets and holds the lens blank in place. It is difficult to obtain accurate placement of the lens blank on the wax and a consistent thickness of the wax. This can lead to machining errors as a result of the lens blank being out of position or tilted relative to the mandrel. The wax can also leave residue on the surface of the lens that produces a hazy or cloudy effect on the surface and thereby impacts the optical performance of the lens. The wax residue must then be cleaned. If the cleaning is not successful or if, as often occurs, the cleaning scratches the lens, then the lens will not achieve the required optical performance (either due to the scratches or the wax residue). It would be advantageous to provide a way of holding an ophthalmic lens blank during machining that reduces machining errors, a lens having an improved optical performance and/or a reduced error rate in the lenses produced.

Recently, ophthalmic lens assemblies in which optical components are contained within the lens have been proposed. Examples of optical components include diffractive optical elements, and electrically-switchable components, including liquid crystal cells. Such assemblies can be produced by encapsulating the optical components between a first lens member and a second lens member. The first and second lens member may between them define the anterior and posterior surfaces of the lens, or the first and second lens member may define an encapsulation component that is subsequently encapsulated within lens material to form the anterior and/or posterior surfaces of the lens. It would be advantageous to provide an efficient way of machining such lens assemblies. Such assemblies may require more accurate machining in order to achieve the required dimensions in view of the number of components involved (e.g. in view of tolerance stacking) and/or may require a higher level of precision in machining in order to allow the optical components to provide the required effects. More accurate machining techniques may therefore be particularly advantageous when applied to such ophthalmic lens assemblies.

An alternative to using wax is to provide a mandrel with a recess that corresponds closely to the dimensions of the lens blank, so that the lens is retained on the mandrel in an interference fit between the recess and the blank. However, the tight fit between the lens blank and the recess may result in excessive forces on the blank when it is machined giving a distorted lens after cutting. Further, this technique may suffer from limitations in terms of the shape of blank it can be used with. For example, it is difficult to machine blanks with very thin edges in this way because of the difficulty in using a thin edge to locate against the side of the recess. It would be advantageous to provide a way of holding an ophthalmic lens blank during machining that reduces error rates, provides a lens having an improved optical performance and/or allows a wider range of lens blank shapes to be machined.

The present disclosure seeks to mitigate the above-mentioned problems. Alternatively or additionally, the present disclosure seeks to provide improved apparatus and/or methods for use in machining ophthalmic lenses.

SUMMARY

In a first aspect, the present disclosure provides a mandrel for holding an ophthalmic lens member blank during machining, the mandrel comprising:

- a front surface for receiving an ophthalmic lens member blank to be machined;
- a rear surface opposite the front surface; and
- one or more through-holes extending between the front and rear surfaces;
- such that, in use, wax applied to the rear surface contacts an ophthalmic lens member blank received on the front surface via said one or more through-holes.

In a second aspect, the present disclosure provides a kit of parts comprising a mandrel according to the first aspect, the mandrel having a socket in the front surface for receiving an adaptor; and one or more of the following:

- an adaptor comprising a convex end portion, the adaptor being configured to be received in the socket such that the convex end portion defines a portion of the front surface of the mandrel;
- an adaptor comprising a concave end portion, the adaptor being configured to be received in the socket such that the concave end portion defines a portion of the front surface of the mandrel;
- an adaptor comprising a flat end portion, the adaptor being configured to be received in the socket such that the flat end portion defines a portion of the front surface of the mandrel.

In a third aspect, the present disclosure provides a method of mounting an ophthalmic lens member blank on a mandrel, the mandrel comprising a front surface, a rear surface and one or more through-holes extending between the front and rear surfaces, the method comprising: the ophthalmic lens member blank being held against the front surface of the mandrel, and while the ophthalmic lens member blank is held against the front surface of the mandrel, applying wax to the rear surface of the mandrel and the wax flowing through said one or more through-holes to contact the rear surface of the ophthalmic lens member blank at the through-holes.

In a fourth aspect, the present disclosure provides a method of machining an ophthalmic lens member blank, the method comprising mounting the ophthalmic lens member blank on a mandrel according to the method of the third aspect, releasing the hold and the lens member blank being retained on the mandrel by the wax; and then machining a front surface of the ophthalmic lens member blank while the lens member blank is retained on the mandrel.

In a fifth aspect, the present disclosure provides a batch of one thousand ophthalmic lenses, each lens being machined using the mandrel of the first and/or second aspects, and/or produced using the method of the third and/or fourth aspects, wherein each lens comprises a central optic zone and an annular peripheral zone surrounding the central optic zone, and the central optic zone of each of lens is free from wax residue and scratches while at least one of said lenses has an annular peripheral zone comprising a surface having a wax residue thereon and/or which is scratched.

In a sixth aspect, the present disclosure provides an ophthalmic lens machined using the mandrel of the first and/or second aspects and/or produced using the method of the third and/or fourth aspects, the lens comprising a central optic zone and a peripheral zone surrounding the central optic zone, the central optic zone is free from wax residue and scratches and the peripheral zone comprises a surface having a wax residue thereon and/or which is scratched.

Optional but preferred features are set out in the dependent claims.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

DESCRIPTION OF THE DRAWINGS

Example embodiments will now be described, by way of example only, with reference to the accompanying schematic drawings, of which.

DETAILED DESCRIPTION

Figure 1A:
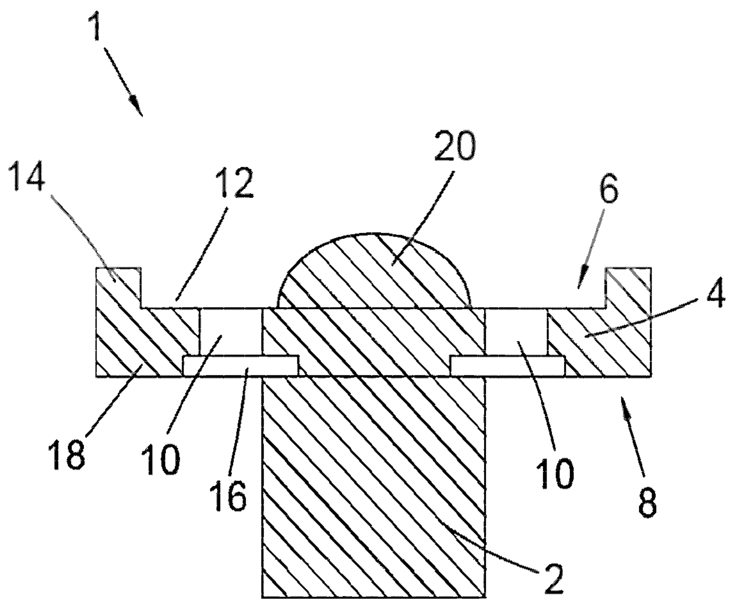
FIG. 1A shows a cross-sectional view of a mandrel according to an embodiment of the disclosure.

According to a first aspect of the disclosure, there may be provided a mandrel for holding an ophthalmic lens member blank during machining. The mandrel may comprise a front surface for receiving an ophthalmic lens member blank to be machined, a rear surface opposite the front surface; and/or one or more through-holes extending between the front and rear surfaces. The mandrel may be configured such that, in use, wax applied to the rear surface contacts an ophthalmic lens member blank mounted on the front surface via said one or more through-holes.

Use of such a mandrel may allow wax to be applied to the ophthalmic lens member blank at one or more discrete locations as defined by the through-holes. A lens member blank positioned against the front surface may be contacted (and then held by) the wax at the opening of the through-hole onto the front surface of the mandrel. This may improve the accuracy with which the lens member blank is positioned on the mandrel and thereby reduce machining errors by removing the variability introduced by needing to apply a wax layer having a certain thickness and/or push the lens member blank into a wax layer by a certain depth. Additionally or alternatively, controlling and limiting the regions in which the wax contacts the lens member blank may reduce the impact of wax residue on the optical performance of the lens.

The term machining may refer to cutting, grinding, polishing and/or other machining processes. Examples of machine tools with which the present disclosure may find application include lathes, grinding machines, polishing machines and/or other machine tools.

It may be that the front surface of the mandrel comprises an optic zone and a peripheral zone, and said one or more through-holes are located in the peripheral zone. Locating the through-holes in the peripheral zone may improve the optical performance of the lens as any wax residue will then be located outside the optic zone. It may be that the optic zone of the front surface is centred on the front surface. It may be that the mandrel is configured such that the optic zone of the front surface is aligned with the optic zone of a lens member blank when said blank is received on the front surface. It may be that the peripheral zone of the front surface is radially outside the optic zone, for example the peripheral zone may be annular and surround the optic zone. It may be that the mandrel is configured such that the peripheral zone of the front surface is aligned with the peripheral zone of a lens member blank when said blank is received on the front surface. The through-holes of the mandrel may be confined to the peripheral zone. It may be that any through-holes extending between the front and back surfaces are located in the peripheral zone. It may be that the front surface of the mandrel is convex, concave or flat in the optic zone.

The front surface of the mandrel, for example in the optic zone, may comprise a concave bowl-shaped surface region configured to receive a convex surface of a lens member blank. The front surface of the mandrel, for example in the optic zone, may comprise a convex dome-shaped surface region configured to receive a concave surface of a lens member blank. The bowl-shaped region or dome-shaped region may be surrounded by a planar surface region. The front surface in the peripheral region may comprise a substantially planar surface. Thus the shape of the front surface may conform to the shape of the anterior or posterior surface of a lens member blank.

The mandrel may comprise a stem for mounting the mandrel on a machine tool. The stem may comprise an elongate body configured to be received in the chuck of a machine tool. The mandrel may comprise a flange extending radially from the stem, for example at one end of the stem.

The flange may comprise the front surface, the rear surface (e.g. on the opposite face of the flange to the front surface) and/or the one or more through-holes. The diameter of the stem may be less than 50% of the diameter of the flange. The front and/or rear surfaces may be substantially perpendicular (not withstanding any recesses formed therein) to the stem. The longitudinal axis of the through-holes may be substantially parallel to the longitudinal axis of the stem and/or the axis of rotation of the mandrel when mounted on a machine tool.

The mandrel may comprise a plurality of through-holes. The plurality of through-holes may be spaced apart circumferentially about the longitudinal axis of the mandrel and/or the stem. The through-holes may be equidistantly spaced about the longitudinal axis.

The front surface of the mandrel may comprise a front-recess, shaped to receive the ophthalmic lens member blank. The front-recess may be configured to receive the lens member blank in a location fit, for example rather than an interference fit. A location fit may be defined as a fit in which the dimensions of the recess match the blank so that the blank is substantially immovable within the recess in the radial sense, but in the absence of wax to hold the blank in place, the blank will fall out of the recess when the mandrel is inverted. This is in contrast to an interference fit, in which, in the absence of wax, the blank will be maintained in the recess when the mandrel is inverted. The dimensions of the front-recess may closely match those of the ophthalmic lens member blank. Providing a front-recess having a shape that closely matches that of the lens member blank may improve the accuracy and reliability with which the lens member blank is positioned on the mandrel (and thereby reduce machining errors). The front-recess may have a diameter from 4 mm to 20 mm inclusive, for example from 10 mm to 20 mm inclusive. The optic zone of the mandrel may be substantially circular in shape and may have a diameter from 2 mm to 10 mm inclusive. In some embodiments, the front-recess has a diameter from 13 mm to 15 mm, and the optic zone of the mandrel has a diameter from 7 mm to 9 mm. The depth of the front-recess may be less than or equal to 1 mm, for example the depth may be from 0.8 mm to 0.2 mm, at the outer edge of the front-recess. The depth of the front-recess may be less than the thickness of the lens member blank at the outer edge of the front-recess. The depth of the front-recess may vary with radius, for example if the front surface comprises a convex or concave region in the optic zone. Providing a shallow recess may allow the mandrel to be used with a wider range of lens thicknesses while still allowing machining of the entire surface of the lens blank. The depth may be measured with respect to the front of the mandrel at its outer edge, for example the front of the flange at its outer edge. In the case that the longitudinal position of the front of the mandrel at its outer edge varies around the circumference, the mean position of the front edge should be used in measuring the depth of the recess. The front-recess may be defined by a raised region, for example an annular raised region. It may be that the raised region is centred on the mandrel, for example on the front surface. The raised region may be concentric with the front-recess, the optic zone and/or the peripheral zone.

The rear surface of the mandrel may comprise a rear-recess, for example an annular recess. The rear-recess may be centred on the rear surface and/or be concentric with the rear surface. The rear-recess may be centred on the flange and/or be concentric with the flange and/or the longitudinal axis of the mandrel. The depth of the rear-recess may be greater than the depth of the front-recess. The depth of the rear-recess may be less than or equal to 5 mm, for example the depth may be from 0.5 mm to 0.4 mm. The depth may be measured with respect to the location of the rear surface at its outermost edge, for example the rear of the flange at its outer edge. In the case that the longitudinal position of the rear surface at its outer edge varies around the circumference, the mean position of the rear edge should be used in measuring the depth of the recess. A plurality of through-holes, for example each through-hole or all the through-holes, may be in fluid communication with the rear-recess and/or each other via the rear-recess. Thus, it may be that wax dispensed into the rear-recess can flow into multiple through-holes. Providing a rear-recess via which wax can be provided to multiple through-holes means a user can simply dispense wax into the rear-recess, rather than to each hole individually. This may assist in providing a more even distribution of wax thereby improving reliability of the hold provided by the mandrel in use and/or increase ease/efficiency of use (e.g. by reducing the number of wax dispensing steps).

Each through-hole may have a first opening on the front surface and a second opening on the rear surface. It may be that the first opening is located in the front-recess and/or the second opening is located in the rear-recess. The through-hole may extend between the first opening and the second opening. Thus, the first and second openings may define the ends of the through-hole. The first opening may be located in the base of the front-recess. The second opening may be located in the base of the rear-recess. The through-holes have a longitudinal axis. It may be that the through-holes are substantially circular, kidney-shaped and/or arcuate, for example an arc of constant radius with respect to the centre of the front surface, when viewed in cross-section perpendicular to their longitudinal axis. It may be that the perimeter of the first and second openings (i.e. the edges of the openings) is curved, and for example does not include any discontinuities, for example sharp corners.

The front surface of the mandrel may comprise one or more drainage channels via which wax and/or air can flow from the front-recess. Providing a drainage channel may allow excess wax to leave the region of the through-holes and thereby reduce variation in the amount of wax protruding beyond the opening of the through-hole on the front surface, which may impact on the position of the lens member blank on the front surface and thereby increase the risk of machining errors. Additionally or alternatively, providing a drainage channel may reduce the risk of air bubbles forming between the blank and the mandrel. A drainage channel may extend from the edge of the front-recess. A drainage channel may extend from the edge of a through-hole, e.g. the opening of the through-hole. A drainage channel that extends directly from the through-hole at the front surface may be particularly advantageous in terms of reducing the build-up of excess wax.

It may be that the front surface comprises the raised region defining the front-recess. The front surface may further comprise a reservoir, for example located radially outside the raised region. It may be that the reservoir is connected to the front-recess by said one or more drainage channels such that excess wax in the front-recess can flow to the reservoir via the drainage channels. The front surface of the raised region may be substantially planar (notwithstanding the presence of any drainage channels). Provision of a reservoir on the front surface may be a mechanically simple way of collecting excess wax and thereby avoiding wax contacting the lens member blank in regions other than those intended. The reservoir may be deeper than the front-recess.

The drainage channels may extend radially and in a straight line from the front-recess to the reservoir. This arrangement may facilitate the flow of wax from the front-recess to the reservoir. The reservoir may take the form of an annular channel defining the outer perimeter of the raised region In some embodiments, the front-recess is substantially circular, the raised region is substantially annular and the reservoir is substantially annular. The front-recess, the raised region and the reservoir may be concentric, and in the following order from innermost to outermost: front-recess, raised region, reservoir.

In a second aspect of the disclosure, there is provided a kit of parts comprising a mandrel having any of the features described above in connection with the first aspect. The mandrel may further comprise a socket in the front surface for receiving an adaptor. The kit of parts may further comprise one or more of the following: an adaptor comprising a convex (dome-shaped) end portion, the adaptor being configured to be received in the socket such that the convex end portion defines a portion of the front surface of the mandrel; an adaptor comprising a concave (bowl-shaped) end portion, the adaptor being configured to be received in the socket such that the concave end portion defines a portion of the front surface of the mandrel; an adaptor comprising a flat end portion, the adaptor being configured to be received in the socket such that the flat end portion defines a portion of the front surface of the mandrel. Thus, an adaptor may be used to provide the convex or concave region of the front surface as described above in the first aspect. Such a reconfigurable mandrel/kit may provide increased efficiency of manufacture and/or ease of manufacture.

In a third aspect of the disclosure there is provided a method of mounting an ophthalmic lens member blank, for example a contact lens member blank, on a mandrel for machining (i.e. as part of a machining process). It may be that the mandrel comprises a front surface, a rear surface and one or more through-holes extending between the front and rear surfaces. The method may comprise holding the ophthalmic lens member blank against the front surface, for example holding a rear surface of the lens member blank against the front surface of the mandrel. The method may comprise applying wax to the rear surface of the mandrel while the ophthalmic lens member blank is held against the front surface. The method may comprise the wax flowing through said one or more through-holes to contact the rear surface of the ophthalmic lens member blank at the through-holes, while the blank is held against the front surface.

The method may comprise the wax only contacting the rear surface of the ophthalmic lens member blank at the through-holes. The method may comprise allowing the wax to set. The method may comprise releasing the hold on the lens member blank (e.g. after the wax has set) and the blank being retained by the wax.

The method may comprise placing the ophthalmic lens member blank on a support, for example a support comprising a bowl-shaped recess or dome-shaped protrusion on its upper surface so as to conform to the front surface of the blank. The method may comprise placing the mandrel on top of the lens member blank on the support, for example such that the weight of the mandrel itself holds the lens member blank against the front surface of the mandrel. The method may comprise dispensing wax onto the rear surface of the mandrel, for example while the rear surface is uppermost, while the mandrel rests on top of the lens member blank. The method may comprise holding the mandrel, and optionally pressing down on the mandrel, before and/or during dispensing of the wax. It will be apparent that the force required to hold the blank against the mandrel will depend, in part, on the pressure, flow rate and volume of the wax as dispensed. When wax is dispensed slowly, under low pressure and in a volume substantially equal to the volume of the through-holes then the wax does not force the blank away from the front surface and very little or substantially no force is required to hold the blank in place. If higher rates, pressure and volumes are involved then it may be necessary to hold the blank against the surface with some force. The method may comprise using a fixture, for example having a cavity configured to receive a portion of the stem, to hold the mandrel in place for example while wax is being dispensed. The use of a support and fixture may assist in keeping the mandrel and lens member in alignment while the wax is applied and thereby reduce the risk of machining errors.

In a fourth aspect of the disclosure, there is provided a method of machining an ophthalmic lens member blank, the method comprising mounting the ophthalmic lens member blank on a mandrel according to the method of the third aspect. The method may comprise mounting the mandrel (the blank being attached thereto by the wax) on a machine tool. For example, the mandrel may be mounted on the machine tool by inserting the stem of the mandrel into a chuck. The method may comprise machining the front surface of the lens member blank. The method may comprise releasing the hold on the ophthalmic lens member blank (which may if shaping has finished be referred to as an ophthalmic lens member) from the mandrel, for example by melting the wax. The method may comprise carrying out further finishing steps on the ophthalmic lens member.

The method may comprise the ophthalmic lens member blank being received in the front-recess of the mandrel in a location fit. The method may comprise dispensing wax into the rear-recess of the mandrel.

An ophthalmic lens member blank may have an anterior surface, being the front surface when the lens is in use on the eye. An ophthalmic lens member blank may have a posterior surface, being the rear surface when the lens is in use on the eye. The posterior surface may comprise a concave (bowl-shaped) region, for example surrounded by a planar region. The anterior surface may comprise a convex (dome-shaped) region, for example surrounded by a planar region. Either of the anterior or posterior surface may be positioned adjacent the front surface of the mandrel to enable machining of the other of the anterior or posterior surface. In this context, the surface of the lens member blank adjacent the front surface of the mandrel is referred to herein as the rear surface of the lens member blank, and the other surface of the lens member blank as the front surface. Thus, at different times the anterior surface of a blank may be referred to as the front surface and the rear surface, depending on the orientation of the blank on the mandrel. It may be that the mandrel has a convex (dome-shaped) surface region when the anterior surface of the lens member blank is being machined and the posterior surface is adjacent the front surface. It may be that the mandrel has a concave (bowl-shaped) surface region when the anterior surface of the lens member blank is being machined and the posterior surface is adjacent the front surface. Providing a front surface that conforms to the shape of the lens member blank being machined may provide improved accuracy in positioning the lens member on the mandrel.

The method may comprise holding one of the anterior and posterior surfaces of the lens member blank against the front surface of a mandrel and applying wax as described in the method of the third aspect, and then machining the other of the anterior and posterior surfaces (and optionally carrying out any of the other method steps described above with the lens member blank mounted on the mandrel in that orientation). The method may comprise removing the lens member blank from the mandrel after the machining of that surface is complete. The method may then be repeated to machine the other of the anterior and posterior surface of the same lens member blank. The method may comprise holding a machined one of the anterior and posterior surfaces of the lens member blank against the front surface of a mandrel and applying wax as described in the method of the third aspect, and then machining the other of the anterior and posterior surfaces (and optionally carrying out any of the other method steps described above with the lens member blank mounted on the mandrel in that orientation). The method may comprise removing the lens member blank from the mandrel after the machining is complete. Thus, the method may provide a method of mounting and/or machining a lens member blank to provide a lens member.

The method may comprise holding the anterior surface of a first lens member blank against the front surface of a mandrel and applying wax as described in the method of the third aspect, and then machining the posterior surface (and optionally carrying out any of the other method steps described above with the first lens member blank mounted on the mandrel in that orientation). The method may then comprise removing the first lens member blank from the mandrel after the machining of that surface is complete. The method may then comprise holding the machined posterior surface of the first lens member blank against the front surface of a mandrel and applying wax as described in the method of the third aspect. The method may comprise mounting one or more optical components on the first lens member blank, for example on the anterior surface of the lens member blank. The method may comprise affixing a second lens member blank on the first lens member blank. The method may then comprise machining the anterior surface of the second lens member blank while the second lens member blank is affixed to the first lens member blank and thereby held on the mandrel (and optionally carrying out any of the other method steps described above with the second lens member blank mounted on the mandrel in that orientation). Thus, the method may provide a method of mounting and/or machining a lens member assembly.

It may be that the machining comprises cutting, for example on a lathe, polishing or grinding, or any other machining operation where the lens must be held and supported.

The following paragraphs describe aspects of ophthalmic lenses relevant to any of the aspects of the present disclosure as described above or below.

An ophthalmic lens may comprise a central optic zone and an annular peripheral zone surrounding the central optic zone, said first and second regions having wax residue thereon being located in the peripheral zone. A lens may have a plurality of regions having wax residue thereon located and spaced apart in the peripheral zone.

An ophthalmic lens may comprise one or more optical components, for example diffractive optical elements, and electrically-switchable components, including liquid crystal cells. An ophthalmic lens may comprise on or more optical components located between first and second ophthalmic lens members.

An ophthalmic lens may comprise an ophthalmic lens member produced by machining an ophthalmic lens member blank. An ophthalmic lens may comprise a lens member blank machined on its anterior surface (i.e. the front surface when in use on the eye) and/or its posterior surface (i.e. the rear surface when in use on the eye). An ophthalmic lens may comprise a single lens member blank machined on its anterior surface and/or its posterior surface. Alternatively, an ophthalmic lens may comprise a two (or more) lens member blanks, each blank being machined on its anterior surface and/or its posterior surface. An ophthalmic lens may comprise a first lens member machined on its posterior surface and a second lens member machined on its anterior surface, for example wherein the second lens member is affixed to the first lens member, optionally, with one or more optical components located therebetween. In some embodiments, said first and second lens members define an encapsulation component, that is itself then encapsulated within lens material to form the lens. In other embodiments, an ophthalmic lens may be formed by the first and second lens members only.

The optic zone of a lens member may be centred on the optic axis. The optic axis may be aligned with the centre of the lens member. The optic zone of a lens or lens member encompasses the parts of the lens that have optical functionality in use. The optic zone may be configured to be positioned over or in front of the pupil of an eye when in use. In plan view, a lens member may have an optic zone surrounded by a peripheral zone. The peripheral zone is not part of the optic zone, but sits outside the optic zone. The peripheral zone may sit above the iris when the lens member is worn. The peripheral zone may provide a mechanical function, for example, increasing the size of the lens member thereby making the lens easier to handle. The peripheral zone may extend to the edge of the lens member. The peripheral zone may provide ballasting to prevent rotation of the lens member, and/or providing a shaped region that improves comfort for the lens wearer.

As used herein, an ophthalmic lens may be a spectacle lens or a contact lens. A lens may comprise one or more lens members produced by machining one or more lens member blanks. A contact lens may comprise one or more contact lens members produced by machining one or more contact lens member blanks.

A contact lens may be a rigid contact lens or a soft contact lens such as a hydrogel contact lens or a silicone hydrogel contact lens. As used herein, the term contact lens refers to an ophthalmic lens that can be placed onto the anterior surface of the eye. It will be appreciated that such a contact lens will provide clinically acceptable on-eye movement and not bind to the eye of a person.

A contact lens may be for correcting or improving vision associated with myopia, presbyopia, hyperopia, astigmatism or another refractive anomaly. A contact lens may be a soft contact lens, such as a hydrogel contact lens or a silicone hydrogel contact lens. A contact lens may be a rigid gas permeable contact lens. A contact lens may be a scleral contact lens.

A contact lens (and therefore the contact lens member blank(s)) may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt).

In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, a lens (and therefore the lens member blank(s)) may comprise, consist essentially of, or consist of a silicone elastomer material. For example, a lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

Alternatively, a lens (and therefore the lens member blank(s)) may comprise polymethyl methacrylate (PMMA).

A contact lens may be substantially circular in shape. A contact lens may have a diameter from 4 mm to 20 mm inclusive, for example from 10 mm to 20 mm inclusive. The optic zone of a contact lens may be substantially circular in shape and may have a diameter from 2 mm to 10 mm inclusive. In some embodiments, a contact lens has a diameter from 13 mm to 15 mm, and the optic zone has a diameter from 7 mm to 9 mm. A contact lens may have a convex anterior surface. A contact lens may have a concave posterior surface.

In a fifth aspect of the disclosure, there is provided a batch of one thousand ophthalmic lenses, for example contact lenses. It may be that each lens of said batch is machined using the mandrel of the first and/or second aspects, and/or the method of the third and/or fourth aspects. It may be that each lens comprises a central optic zone and a peripheral zone surrounding the central optic zone, and the central optic zone of each of lens is free from wax residue and/or scratches while at one of said lenses has a peripheral zone comprising a surface having a wax residue thereon and/or which is scratched. The peripheral zone may be an annular peripheral zone.

Prior art methods of machining a lens using wax to hold the lens member on a mandrel provide a high number of lenses with wax residue in the optic zone and/or scratches (caused by removing said wax residue) in the optic zone. No known method that uses wax results in an error rate of less than 1 in 1000 lenses for these defects. Lenses produced using the mandrel of the present disclosure may avoid such defects by restricting the areas where the wax contacts the lens blank to the peripheral zone.

It may be that at least 10 percent, for example at least 20 percent of said lenses have an annular peripheral zone comprising a surface having a wax residue thereon and/or which is scratched.

It will be appreciated that the lenses of a batch are sequentially produced. As used herein 'sequentially produced' means the batch is composed of lenses produced one after another without any intervening lenses which do not form part of the batch.

As used herein 'wax residue' refers to left-over wax on the surface of the lens/lens member that is visible to the naked eye.

As used here 'scratches' refers to one or more scratches on the surface of the lens or a lens member that are visible to the naked eye.

The regions having wax residue thereon may correspond to the location of the through-holes when the lens is held against the front surface of the mandrel. It may be that the peripheral zone comprises a surface having a first region having a wax residue thereon, and a second region having a wax residue thereon, the first region being spaced apart from the second region. Each region may correspond to the position of a through-hole.

It may be that each ophthalmic lens comprises a first ophthalmic lens member, a second ophthalmic lens member and one or more optical components located between the first and second ophthalmic lens members. It may be that the optical region of each of the first and second lens member is free of wax residue and/or scratches. It may be that said at least one lens comprises a first and/or second lens member having an annular peripheral zone comprising a surface having a wax residue thereon and/or which is scratched.

In a sixth aspect of the disclosure, there is provided an ophthalmic lens machined using the mandrel of the first and/or second aspects, and/or the method of the third and/or fourth aspects. It may be that the lens comprises a central optic zone and a peripheral zone surrounding the central optic zone. It may be that the central optic zone is free from wax residue and scratches and the peripheral zone comprises a surface having a wax residue thereon and/or which is scratched. The lens of the sixth aspect may have any of the features described above with respect to the fifth (or any other) aspect of the disclosure.

Figure 1B:
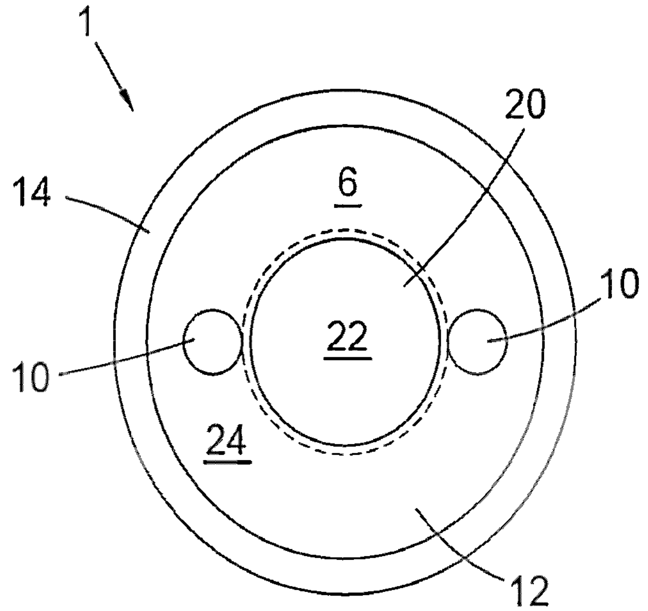
FIG. 1B shows a front view of the mandrel of FIG. 1A.
Figure 1C:
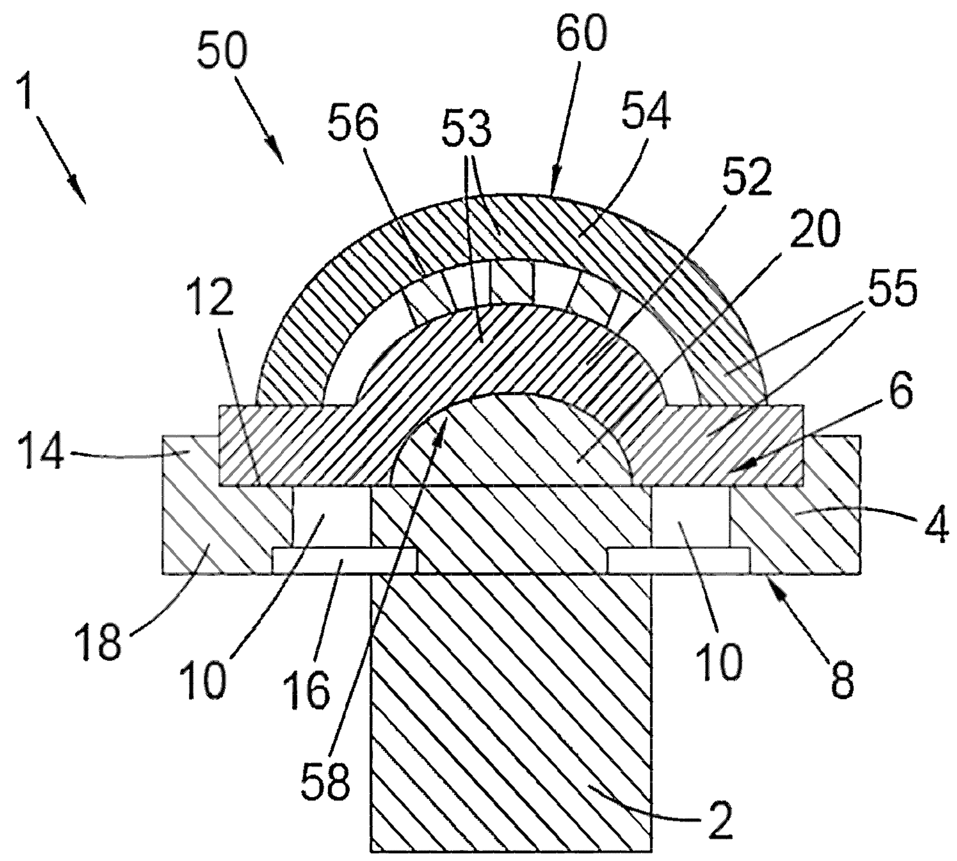
FIG. 1C shows a cross-sectional view of the mandrel of FIG. 1A with an ophthalmic lens blank assembly mounted thereon.

With reference to FIG. 1A, FIG. 1B and FIG. 1C there is shown a mandrel 1 according to an embodiment of the present disclosure. The mandrel comprises a stem 2 and a flange 4 at one end of the stem 2 and extending radially outward from the stem 2. The flange 4 defines part of a front surface 6 of the mandrel located on the opposite side of the flange 4 to the stem 2, and a rear surface 8 located on the opposite side of the flange 4 to the front surface 6. Two through-holes 10 extend through the flange 4 between the front surface 6 and the rear surface 8. The through-holes 10 are located on opposite sides of the stem 2 and appear circular when viewed in plan in FIG. 1B. A front-recess 12 is formed in the front surface 6 by a rim 14 extending around the circumference of the flange 4. A rear-recess 16 is formed in the rear surface 8 by a rim 18 extending around the circumference of the flange 4. Through-holes 10 extend between the base of the front-recess 12 and the base of the rear-recess 16. The mandrel 1 comprises a dome 20 defining part of front surface 6. The dome 20 is located concentrically with the flange 4 and stem 2 and on the opposite side of the flange 4 to the stem 2. The dome 20 is centred in an optic zone 22 of the front surface and the through-holes 10 are located in an annular peripheral zone 24 located outside the optic zone 22. A dashed line denotes the extent of optic zone 22 in FIG. 1B.

FIG. 1C shows a schematic cross-sectional view of the mandrel 1 of FIG. 1A with a contact lens member assembly 50 fixed thereon using wax (not shown). The contact lens member assembly 50 comprises a first lens member blank 52 and a second lens member blank 54. The second lens member blank 54 is concentrically mounted on the first lens member blank 52 with optical components 56 encapsulated between the first and second lens member blanks 52, 54.

Each of the first and second lens member blanks 52, 54 comprises an optic zone 53 centrally located on the lens member, and an annular peripheral zone 55 concentrically located with and surrounding the optic zone 53. In FIG. 1C the contact lens member assembly 50 is arranged with the posterior surface of the first lens member blank 52 against the front surface 6 of the mandrel 1 so that the anterior surface of the second lens member blank 54 is the front surface 60 of the assembly 50 and can then be machined. The rear surface 58 of the first lens member blank 52 is therefore concave in the optic zone 53 and planar in the peripheral zone 55 and thereby conforms to the shape of the front surface 6 as defined by the flange 4 and dome 20. Through-holes 10 are located in the peripheral zone 55. While FIG. 1C and the following embodiments are concerned with contact lens members and contact lens member assemblies, it will be appreciated that other ophthalmic lens members/lens member assemblies may be machined using the mandrel of the present disclosure. While FIG. 1C shows a contact lens member assembly formed by two contact lens members, it will be appreciated that a single contact lens member, or a contact lens member assembly formed by more than two lens members may be machined using the mandrel of the present disclosure. A batch may comprise one thousand contact lenses each lens being formed by a contact lens member assembly 50 as shown in FIG. 1C.

In use, wax is dispensed into rear-recess 16 and flows into through-holes 10 to contact the rear surface 58 of the first lens member 52. In this way, the lens assembly is secured in position on the mandrel, but the wax only contacts the rear surface 58 at the location where the through-holes 10 open onto the front surface 6. This may enable the locations where the wax contacts the lens assembly to be controlled, and for example limited to the non-optical regions of the lens. For example, in FIG. 1C the through-holes 10 are located in the peripheral zone 55 so that any haze on the lens as a result of the wax does not impact on the optic zone 53.

Figure 2A:
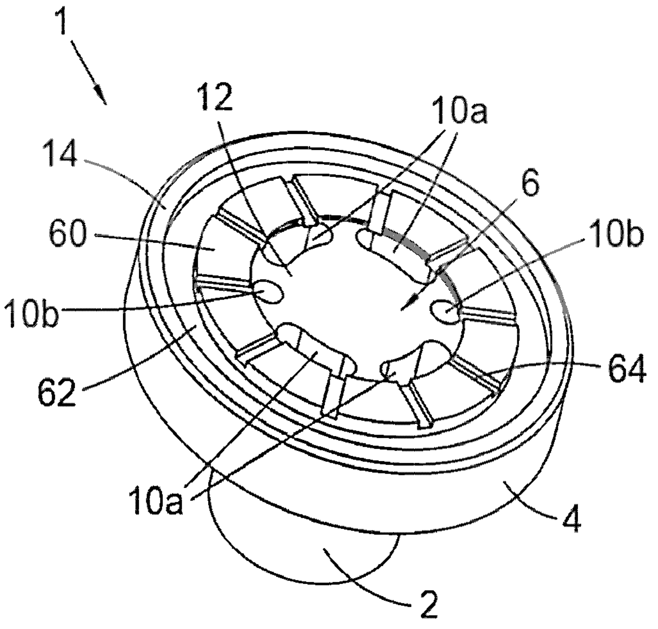
FIG. 2A shows a perspective view of a mandrel according to an embodiment of the disclosure.
Figure 2B:
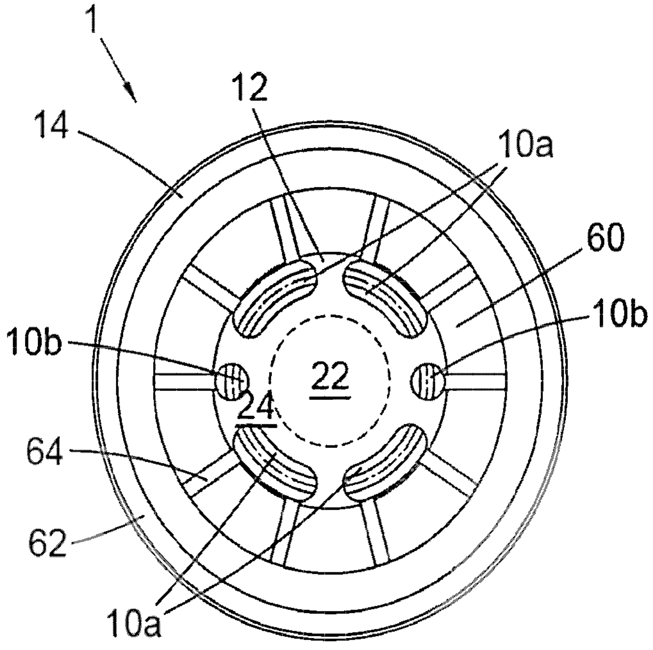
FIG. 2B shows a front view of the mandrel of FIG. 2A.
Figure 2C:
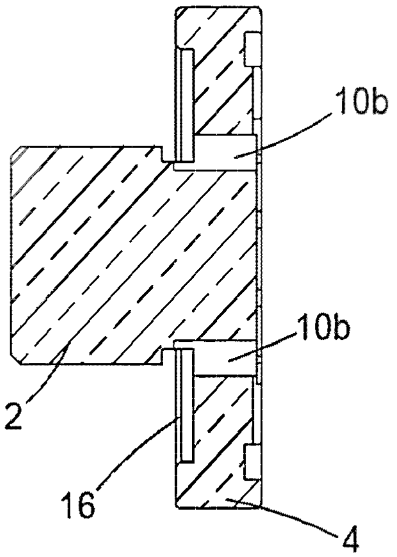
FIG. 2C shows a cross-sectional view of the mandrel of FIG. 2A.

With reference to FIG. 2A, FIG. 2B and FIG. 2C there is shown a mandrel 1 in accordance with a second example embodiment of the disclosure. Only those aspects of the second embodiment which differ with respect to the first embodiment will be discussed here. Like reference numerals have been used to denote like elements as between the first and second embodiments (e.g. through-holes 10). In contrast to the first embodiment, the mandrel 1 of the second embodiment has six through-holes 10—four through-holes 10*a* that appear kidney shaped when viewed in plan (kidney-shaped through-holes) and two through-holes 10*b* that appear circular when viewed in plan (circular through-holes). The two circular through-holes 10*b* are located opposite each other around the circumference of the front-recess 12 in the peripheral zone 24 (as shown in FIG. 2B), with the four kidney-shaped through-holes 10*a* forming two opposing pairs on opposite sides of the peripheral zone 24. The optic zone 22 (as show in FIG. 2B) is flat. An annular raised region 60 extends around the outside of peripheral zone 24 and an annular reservoir 62 extends around the outside of peripheral zone 24. The annular raised region 60 includes a number of radially extending flow channels 64, each channel extending from a through-hole 10 to the annular reservoir 62.

In use, excess wax may flow from through-holes 10 to annular reservoir via the radially extending grooves 64, thereby avoiding excess wax contacting the rear surface of a lens member located on the mandrel.

Figure 3A:
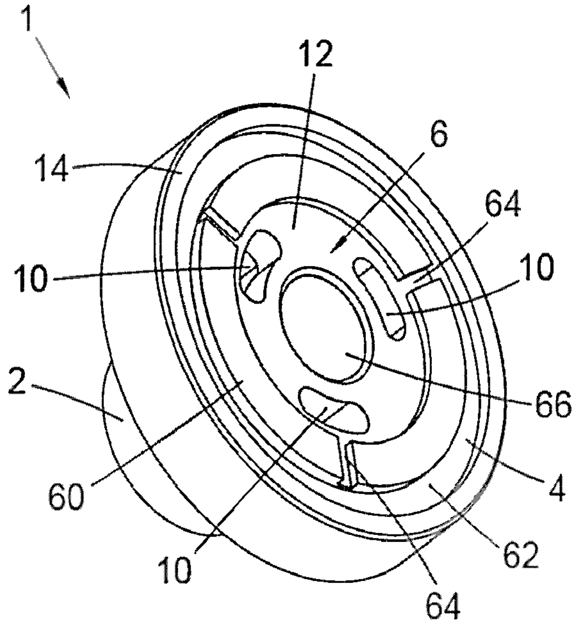
FIG. 3A shows a perspective view of a mandrel according to an embodiment of the disclosure.
Figure 3B:
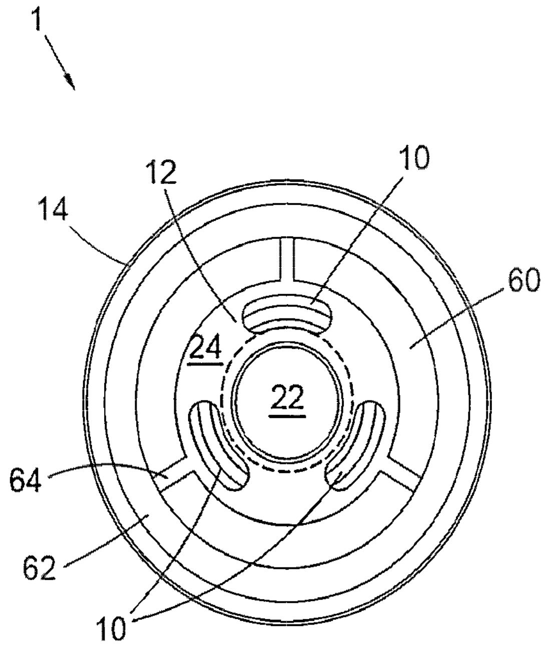
FIG. 3B shows a front view of the mandrel of FIG. 3A.
Figure 3C:
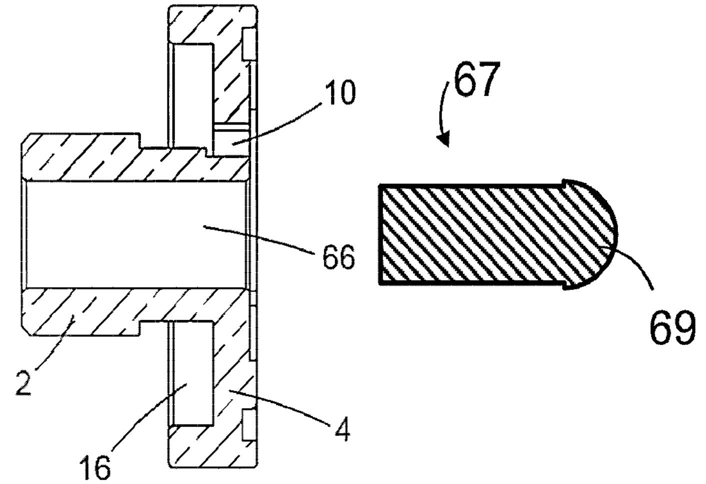
FIG. 3C shows a cross-sectional view of the mandrel of FIG. 3A.

FIG. 3A, FIG. 3B and FIG. 3C show a mandrel 1 in accordance with a third example embodiment of the disclosure. Only those aspects of the third embodiment which differ with respect to the first embodiment will be discussed here. Like reference numerals have been used to denote like elements as between the first and third embodiments (e.g. through-holes 10). In contrast to the first embodiment, the mandrel 1 of the third embodiment has three kidney-shaped through-holes 10, spaced equidistantly around the circumference of the flange 4 in the peripheral zone 24 (as shown in FIG. 3B). As in the second embodiment, an annular raised region 60 extends around the outside of peripheral zone 24 and an annular reservoir 62 extends around the outside of peripheral zone 24. The annular raised region 60 includes three radially extending grooves 64, each groove extending from the outer edge of the front-recess 12 adjacent one of the through-holes 10 to the annular reservoir 62.

In use, excess wax may flow from through-holes 10 to annular reservoir via the radially extending grooves 64, thereby reducing any build up of excess wax in the region of the through-holes 10. While the radially extending grooves 64 do not connect directly to the through-holes 10 in the third embodiment they may still offer benefits in terms of reducing contact between the wax and the rear surface of the lens member outside of the region of the through-holes 10.

As shown more clearly in FIG. 3C an axial cavity 66 extends along the length of the mandrel 1. Axial cavity 66 provides a socket into which adaptor 67 comprising a dome-shaped end portion 69 can be inserted in order to define a convex part of front surface 6 and support a lens member mounted thereon. The provision of the axial cavity 66 may thereby provide a more flexible mandrel that can be reconfigured for use in machining the anterior and posterior surface of a lens member blank.

Figure 4:
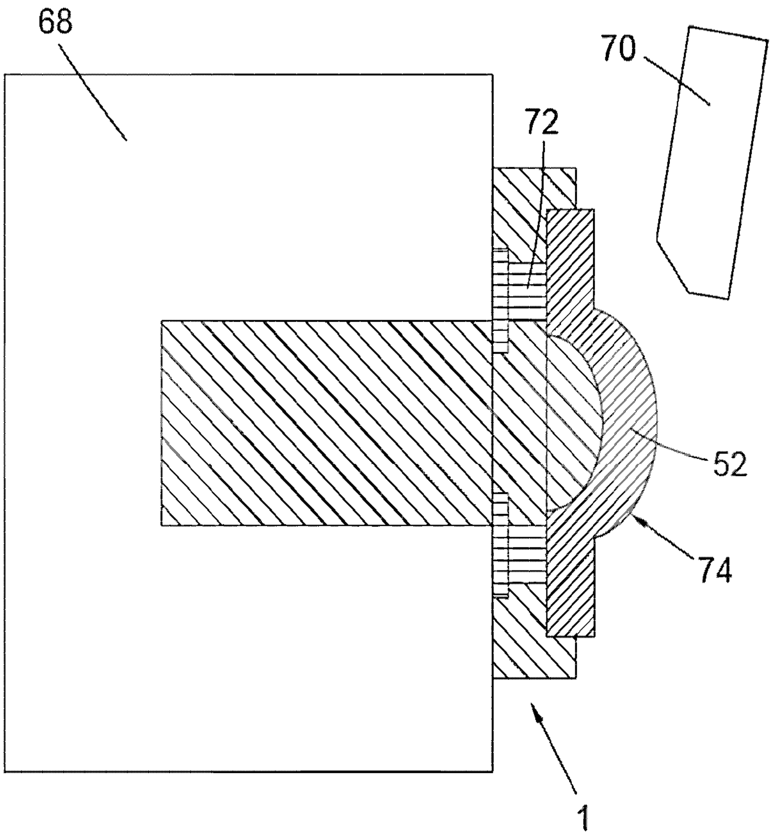
FIG. 4 shows a schematic cross-sectional view of a mandrel according to an embodiment of the disclosure with an ophthalmic lens member blank mounted thereon, the mandrel being mounted on a lathe for machining of the lens member blank.

FIG. 4 shows a mandrel 1 in accordance with an example embodiment of this disclosure mounted in a chuck 68 of a lathe (not shown) for cutting with cutting tool 70. Wax 72 fills through-holes 10 and rear-recess 16 and contacts rear surface 58 of a first lens member blank 52 received in front-recess 12. In use, the cutting tool 70 cuts the front surface 74 of the first lens member, which in FIG. 4 is an anterior surface of the lens member. While FIG. 4 shows a mandrel 1 in a lathe, it will be appreciated that other machining operations can be carried out using the mandrel of the present disclosure, for example polishing and/or grinding.

Figure 5:
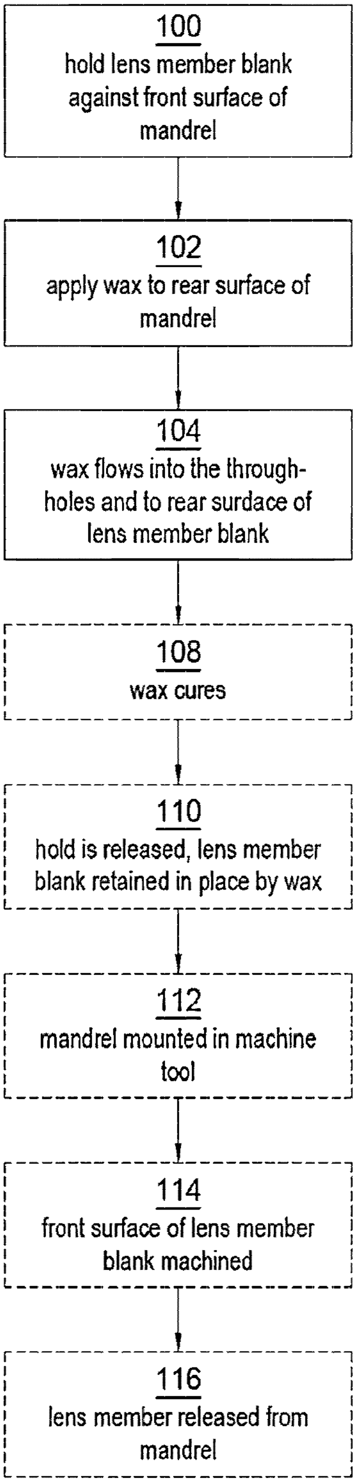
FIG. 5 shows a flow chart of a method of mounting an ophthalmic lens member blank on a mandrel in accordance with the present disclosure.

FIG. 5 shows a flow chart of an example method in accordance with the present disclosure. A lens member blank in held 100 against the front surface of the mandrel. Wax is then dispensed 102 onto the rear surface of the mandrel, flows 104 into the through-holes and contacts the rear surface of the lens member blank which is adjacent the front surface of the mandrel. Optionally, the method may include the following further steps (individually or in combination), with optional steps being indicated with a dashed line in FIG. 5. After the wax flows 104 to and contacts the surface of the lens member blank, the wax is then allowed to cure 108. The hold on the blank is then released and the lens member blank is retained 110 in place by the wax. The mandrel is then mounted 112 in a lathe (or other machine tool), for example by the stem of the mandrel being received in a chuck of the lathe. The front surface of the lens member blank is then machined 114, for example cut. The wax is then melted to release 116 the lens member blank from the mandrel.

In the case that a lens member machined on both the anterior and posterior surfaces is required, then the steps discussed above are carried out with the anterior surface of the lens member being contacted by the wax, and the posterior surface of the lens member being machined. After the lens member is released 116 from the mandrel, the steps discussed above are then carried out with the posterior surface of the lens member being contacted by the wax, and the anterior surface of the lens member being machined (or vice versa). The resulting lens member is then sent for finishing. Reconfiguration of the mandrel (e.g. by changing between differently-shaped adaptors) or a differently shaped mandrel may be required in order to support the lens depending on whether the anterior or posterior surface is being machined.

In the case that a lens member assembly comprising two lens members is required, then the steps discussed above are carried out with the anterior surface of a first lens member being contacted by the wax, and the posterior surface of the first lens member being machined. The method may then include repeating steps 100 to 110 as described above with the first lens member blank having its posterior surface held against the front surface of the mandrel. Optionally, steps 112 and 114 are repeated to machine the anterior surface of the first lens member. Optical components, for example optoelectronic components, are then mounted on the front surface of the first lens member blank. The second lens member blank is then affixed to the first lens member blank, with its anterior surface proximal the first lens member blank. Steps 112 and 116 are then repeated to machine the posterior surface of the second lens member blank and release the assembly from the mandrel. The resulting lens member assembly is then sent for finishing.

Figure 6:
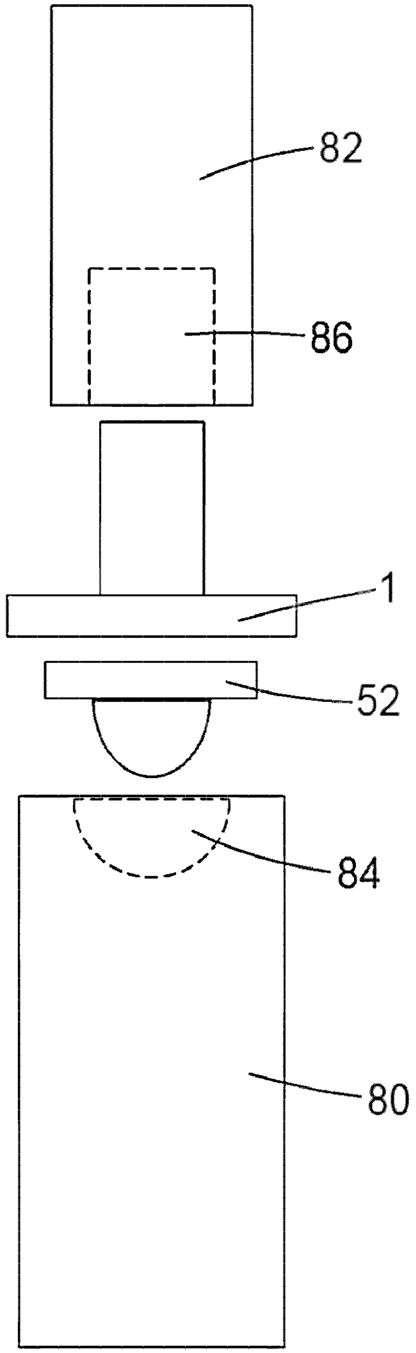
FIG. 6 shows a support assembly for use in mounting a lens member blank on a mandrel in accordance with an embodiment of the disclosure.

FIG. 6 shows an exploded view of a mandrel 1, lens member blank 52, a first support 80 and a second support 82 in accordance with an embodiment of the present disclosure. The lens member blank 52 is shown above first support 80, the uppermost surface of which comprises a bowl-shaped cavity 84 corresponding to the shape of the front surface of the lens member blank 52 (which in FIG. 6 is the anterior surface). Mandrel 1 is shown above the lens member blank 52 with its front surface facing downwards and the second support 82 is shown above the mandrel 1. The lowermost surface of the second support 82 comprises a cylindrical cavity 84 corresponding to the shape of the stem of the mandrel. In use, the lens member blank 52 is placed atop the first support 80 with the dome of its front surface received in the bowl-shaped cavity 84. The mandrel is then placed atop the lens member blank 52 with its front surface against the rear surface of the lens member blank 52. The second support 82 is then placed atop the mandrel 1 with the stem of the mandrel 1 received in the cylindrical cavity 86. Together, the second support 82 and first support 80 hold the mandrel 1 and lens member blank 52 in alignment while wax is applied to the mandrel 1. In FIG. 6 the lens member blank is shown with the anterior surface being arranged for machining. It will be appreciated that if the posterior surface is to be machined, it may be desirable to replace the bowl-shaped cavity 84 with a domed surface, in order to better support the lens member blank 52.

Figure 7:
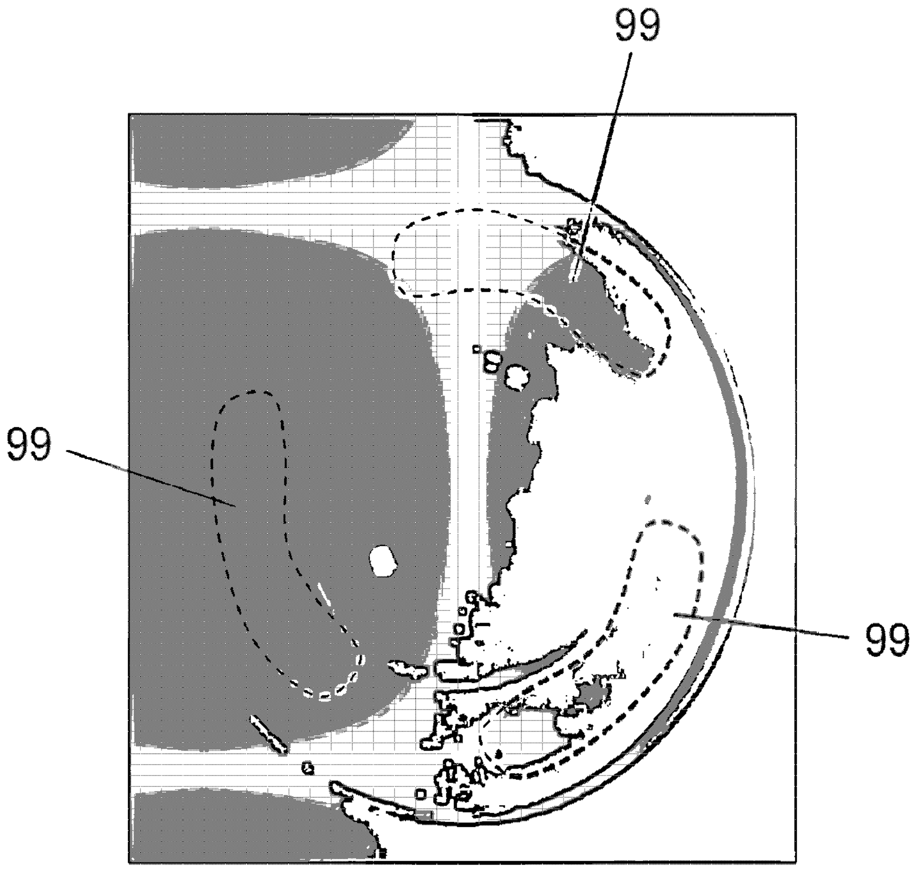
FIG. 7 shows a photograph of an ophthalmic lens member produced using a mandrel according to an embodiment of the disclosure.

FIG. 7 shows a photograph of a contact lens member in accordance with embodiments of the disclosure. Wax residue 99 is shown in three discrete regions on the peripheral zone of the lens member. For clarity, dashed lines have been added to the photograph to indicate the approximate extent of the regions. FIG. 7 shows a lens member that is combined with a second lens member to form an encapsulation component, and then subsequently encapsulated within lens material to form the lens.

Whilst the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

The invention claimed is:

1. A kit of parts comprising:

a mandrel for holding an ophthalmic lens member blank during machining, the mandrel comprising a front surface for receiving said ophthalmic lens member blank to be machined, a rear surface opposite the front surface, and one or more through-holes extending between the front and rear surfaces, such that, in use, wax applied to the rear surface contacts said ophthalmic lens member blank received on the front surface via said one or more through-holes, wherein the mandrel comprises a stem for mounting the mandrel on a machine tool and a flange extending radially from the stem, the flange comprising part of the front surface, part of the rear surface, and the one or more through-holes, wherein the front surface of the mandrel comprises a central optic zone and an annular peripheral zone, and said one or more through-holes are located in the peripheral zone, the mandrel having a socket in the front surface for receiving an adaptor; and one or more of the following:

a convex adaptor comprising a convex end portion, the convex adaptor being configured to be received in the socket such that the convex end portion defines a portion of the front surface of the mandrel;

a concave adaptor comprising a concave end portion, the concave adaptor being configured to be received in the socket such that the concave end portion defines a portion of the front surface of the mandrel;

a flat adaptor comprising a flat end portion, the flat adaptor being configured to be received in the socket such that the flat end portion defines a portion of the front surface of the mandrel.

2. The kit according to claim 1, wherein the mandrel having has a longitudinal axis, and wherein said one or more through-holes are a plurality of through-holes spaced apart circumferentially about the longitudinal axis.

3. The kit according to claim 2, wherein the plurality of through-holes are equidistantly spaced about the longitudinal axis.

4. The kit according to claim 1, wherein the front surface comprises a front-recess, shaped to receive the ophthalmic lens member blank.

5. The kit according to claim 4, wherein each of said one or more through-holes has a first opening on the front surface and a second opening on the rear surface, and optionally wherein the first opening is located in the front-recess.

6. The kit according to claim 5, wherein the front surface comprises a raised annular region defining the front-recess, and an annular reservoir located radially outside the raised region, the reservoir being connected to the front-recess by one or more drainage channels such that excess wax in the front-recess can flow to the reservoir via the drainage channels.

7. The kit according to claim 1, wherein the rear surface comprises a rear-recess.

8. The kit according to claim 7, wherein said one or more through-holes are a plurality of through-holes, wherein each of said plurality of through-holes has a first opening on the front surface and a second opening on the rear surface, and optionally wherein the second opening is located in the rear-recess.

9. The kit according to claim 1, wherein each of said one or more through-holes has a longitudinal axis, and each of said one or more through-holes is circular, kidney-shaped and/or arcuate when viewed in cross-section perpendicular to their longitudinal axis.

10. The kit according to claim 1, wherein the ophthalmic lens member blank is a contact lens member blank.

11. The kit according to claim 1, wherein the front surface of the mandrel comprises a front-recess, shaped to receive the ophthalmic lens member blank in a location fit.

12. The kit according to claim 1, wherein the rear surface of the mandrel comprises a rear-recess that is an annular recess.

13. The kit according to claim 1, wherein each of said one or more through-holes has a longitudinal axis, and each of said one or more through-holes is circular, kidney-shaped and/or arcuate having an arc of constant radius with respect to the centre of the front surface, when viewed in cross-section perpendicular to their longitudinal axis.

14. The kit according to claim 1, wherein the ophthalmic lens member blank is a contact lens member blank for a soft contact lens that is a hydrogel contact lens or a silicone hydrogel contact lens or for a rigid gas permeable contact lens.

15. A method of mounting an ophthalmic lens member blank on the mandrel of the kit of claim 1, the method comprising:

the ophthalmic lens member blank being held against the front surface of the mandrel, and while the ophthalmic lens member blank is held against the front surface of the mandrel, applying wax to the rear surface of the mandrel and the wax flowing through said one or more through-holes to contact the rear surface of the ophthalmic lens member blank at the through-holes.

16. The method according to claim 15, wherein the ophthalmic lens member blank is received in a front-recess formed in the front surface of the mandrel in a location fit and the wax is dispensed into a rear-recess formed in the rear surface of the mandrel, and said one or more through-holes extend between the front-recess and the rear-recess.

17. A method of machining the ophthalmic lens member blank, the method comprising mounting the ophthalmic lens member blank on the mandrel according to the method of claim 15, and then, the lens member blank being retained on the mandrel by the wax; and then machining a front surface of the ophthalmic lens member blank while the ophthalmic lens member blank is retained on the mandrel by the wax.

18. The method according to claim 17, comprising:

while holding a first ophthalmic lens member blank against the front surface, the first ophthalmic lens member blank being said ophthalmic lens member blank, applying wax to the rear surface of the mandrel and the wax flowing through said one or more through-holes to contact the rear surface of the first ophthalmic lens member blank at said one or more through-holes, and then, while the first ophthalmic lens member blank is retained on the mandrel by the wax:

mounting one or more optical components on the first ophthalmic lens member blank and;

affixing a second ophthalmic lens member blank to the first ophthalmic lens member blank such that the optical components are located between the first and second ophthalmic lens member blanks, and then machining the front surface of the second ophthalmic lens member blank.

* * * * *